United States Patent
Saldana

[11] Patent Number: 6,083,082
[45] Date of Patent: Jul. 4, 2000

[54] SPINDLE ASSEMBLY FOR FORCE CONTROLLED POLISHING

[75] Inventor: Miguel A. Saldana, Fremont, Calif.

[73] Assignee: Lam Research Corporation, Fremont, Calif.

[21] Appl. No.: 09/385,769

[22] Filed: Aug. 30, 1999

[51] Int. Cl.[7] ........................................... B24B 49/00
[52] U.S. Cl. ................ 451/5; 451/8; 451/9; 451/11; 451/41; 451/63
[58] Field of Search ................ 451/5, 8, 9, 11, 451/41, 63

[56] References Cited

U.S. PATENT DOCUMENTS

| | | |
|---|---|---|
| 3,631,634 | 1/1972 | Weber . |
| 3,691,694 | 9/1972 | Goetz et al. . |
| 3,903,653 | 9/1975 | Imhoff et al. . |
| 4,002,246 | 1/1977 | Brandt et al. . |
| 4,009,539 | 3/1977 | Day . |
| 4,020,600 | 5/1977 | Day . |
| 4,141,180 | 2/1979 | Gill, Jr. et al. . |
| 4,450,652 | 5/1984 | Walsh ........................................ 451/7 |
| 4,593,495 | 6/1986 | Kawakami et al. . |
| 4,680,893 | 7/1987 | Cronkhite et al. . |
| 4,934,102 | 6/1990 | Leach et al. . |
| 5,148,632 | 9/1992 | Adler et al. . |
| 5,157,871 | 10/1992 | Gawa et al. ................................. 451/5 |
| 5,325,636 | 7/1994 | Attanasio et al. . |
| 5,456,627 | 10/1995 | Jackson et al. ............................ 451/11 |
| 5,618,447 | 4/1997 | Sandhu ...................................... 438/14 |
| 5,643,044 | 7/1997 | Lund . |
| 5,658,183 | 8/1997 | Sandhu et al. . |

FOREIGN PATENT DOCUMENTS

| | | |
|---|---|---|
| 0 118 126 A3 | 9/1984 | European Pat. Off. . |
| 0 146 004 A3 | 6/1985 | European Pat. Off. . |

OTHER PUBLICATIONS

U.S. application No. 08/968,333, filed Nov. 12, 1997.

*Primary Examiner*—David A. Scherbel
*Assistant Examiner*—Shantese McDonald
*Attorney, Agent, or Firm*—Brinks Hofer Gilson & Lione

[57] ABSTRACT

A spindle assembly for force controlled operation in applications such as the chemical mechanical planarization of semiconductor wafers includes an axially and rotatably movable spindle driven by a force producing device. The force producing device is controlled by a position feedback loop in a first mode of operation and a spindle force control feedback loop in a second mode of operation so that the same force producing device controls spindle movement in the first mode of operation and maintains a constant pressure on a workpiece based on the detected applied pressure in the second mode of operation.

23 Claims, 3 Drawing Sheets

SPINDLE ASSEMBLY FOR FORCE CONTROLLED POLISHING

BACKGROUND

This invention relates to a high performance spindle assembly for forced controlled polishing of metals, plastics, or other materials requiring the application of a constant force. More particularly, the present invention relates to a spindle assembly for force controlled polishing or planarization of semiconductor wafers.

Systems for applying force to a workpiece, such as a semiconductor wafer, have in the past measured the pressure applied at the spindle or focused on monitoring the position of the spindle relative to the polishing surface. For example, one version of a spindle assembly for use in polishing a workpiece includes a vertically oriented, spring counterbalanced spindle utilizing a single-acting diaphragm cylinder as a down force mechanism. A pneumatic proportional regulator is used with a built-in pressure transducer feedback loop connected to the diaphragm cylinder in order to control force output of the diaphragm cylinder.

In operation, this system lowers the spindle to a correct polishing height using two different cylinder mechanisms. First, a conventional piston cylinder lowers the spindle to a mechanical hard stop. Then, by pressurizing a diaphragm cylinder, the spindle is moved until the workpiece reaches the polishing surface. The pressure transducer in this device monitors the performance of the diaphragm cylinder and feeds back the result to the pneumatic proportional regulator. Because the pressure transducer in this system is an integral component of the E/P regulator supplying pressure to the diaphragm cylinder, the pneumatic proportional regulator does not receive the actual force placed on the workpiece by the spindle. In practice, a certain amount of the pressure applied by the diaphragm piston is lost due to friction losses in the cylinder, bearings, and various other mechanical components of the spindle assembly. This friction is not seen by the pneumatic proportional regulator because the differential pressure transducer only receives information from the diaphragm cylinder.

Another system for providing a continuous down force to a workpiece being polished includes a rolling diaphragm cylinder operatively connected to a spindle through a linkage system. The spindle is guided by a spline bearing that allows longitudinal and rotational movement by the spindle. The diaphragm cylinder is controlled by a servo valve as part of a proportional amplifier loop that receives feedback from between the servo valve and diaphragm cylinder to monitor position/force applied to a workpiece. Again, the friction due to the diaphragm cylinder, and the additional friction added by the spline bearing guiding the spindle, are not seen in the control loop of the servo valve. Due to the friction, a hysteresis effect may be experienced at the output. This effect reduces the accuracy of position/force measurements. Accordingly, a spindle drive assembly is necessary that provides improved downforce accuracy.

BRIEF SUMMARY

In order to improve on the accuracy of prior art systems for providing downforce on a workpiece in a polishing environment, the preferred embodiments described below improve the force resolution capability of the spindle assembly and reduce friction introduced by mechanical linkages in the spindle assembly. Additionally, these embodiments address the need for increased polishing accuracy by measuring force applied at the workpiece and closing a servo control loop on force feedback rather than using position or pressure feedback measured at a point on the spindle assembly away from the workpiece.

The spindle assembly, described below, for applying a constant pressure to a workpiece includes an axially movable spindle having a holding device connected to one end. A load cell is mounted on the holding device and is positioned to sense a pressure applied to the workpiece and produce a load sense signal representative of the pressure applied. A force producing device is operatively coupled to the spindle and is configured to impart a force along a longitudinal axis of the spindle. A positional transducer is also operatively connected to the spindle and is configured to produce a position signal representative of the axial position of the spindle. A servo controller is in communication with the positional transducer via a first feedback loop, the load cell via a second feedback, and the force producing device. The servo controller transmits a control signal to the force producing device.

The preferred method described below for force controlled processing of a workpiece includes the steps of moving an axially movable spindle along a longitudinal axis and monitoring the position of the spindle with a first feedback loop. After the spindle moves a predetermined amount, the method includes the step of disengaging the first feedback loop and applying a constant force to a workpiece mounted on the end of the spindle by monitoring a force at the workpiece over a second feedback loop and continuously adjusting the position of the spindle based on the force measured at the workpiece. The same force producing device is used to control position of the spindle in a first mode of operation and force applied to the workpiece in a second mode of operation. The preferred force producing device is an electromagnetic force producing device that, in cooperation with aerostatic bearings, reduces system friction and increases the resolution of force control for the spindle during a polishing/grinding operation.

This section has been provided by way of introduction only and is not intended to limit the scope of the following claims.

DETAILED DESCRIPTION OF THE PRESENTLY PREFERRED EMBODIMENTS

Figure 1:
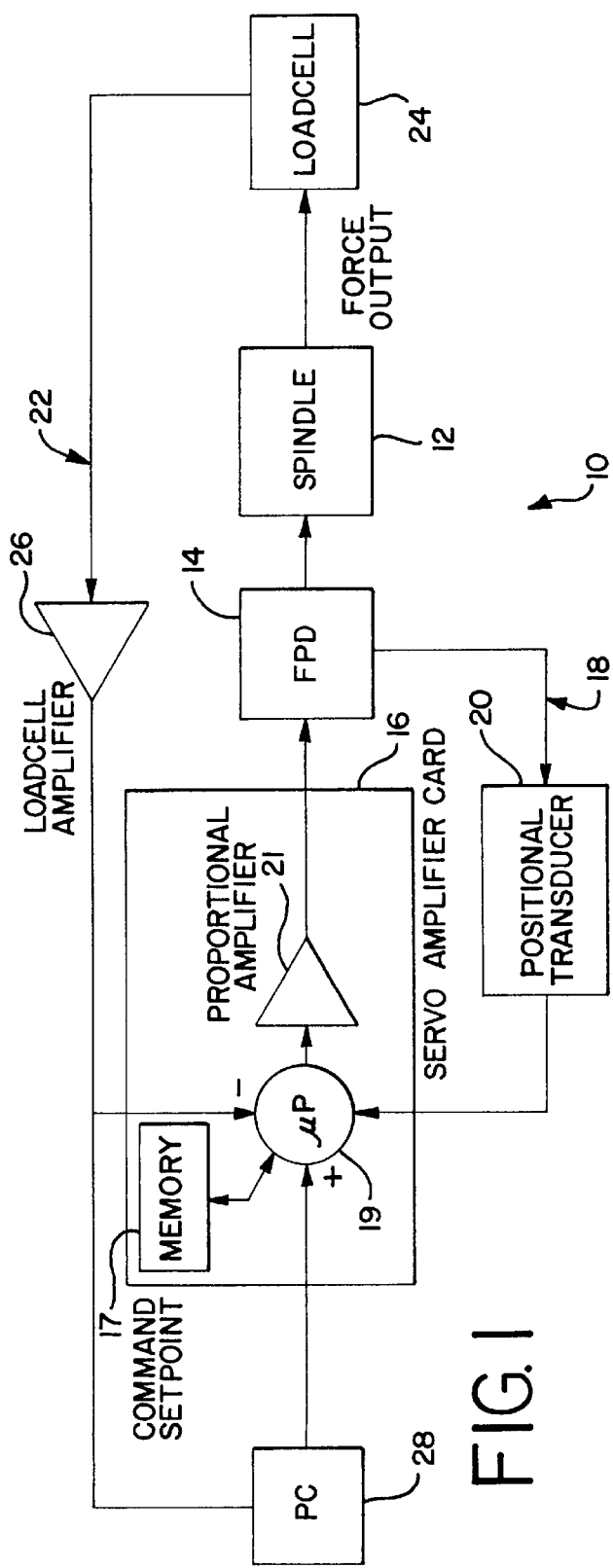
FIG. 1 is a schematic illustration of a spindle assembly for force controlled polishing according to a preferred embodiment of the present invention.

FIG. 1 illustrates a spindle assembly 10 according to a preferred embodiment. The spindle assembly preferably includes a rotatable, axially movable spindle 12. The spindle 12 is axially movable through a bearing assembly (not shown) by a force producing device 14 operatively connected to the spindle 12. In order to both move a workpiece and control the force applied to the workpiece through the spindle 12, the spindle assembly 10 preferably includes two feedback loops in communication with a servo controller 16 that regulates operation of the force producing device 14. The servo controller includes memory 17, a processor 19, and a proportional amplifier 21. A position feedback loop 18 provides information to the servo controller 16 by way of a positional transducer 20 in communication with the force producing device 14. One suitable positional transducer is a glass scale type linear encoder available from RSF of Rancho Cordoba, Calif.

The positional feedback loop is used when the spindle assembly operates in a position adjusting mode to monitor and control gross axial motion of the spindle. For example, the spindle assembly 10 preferably uses the position feedback loop 18 for controlling the axial spindle movement needed to bring the workpiece to a desired processing surface from a standby position. The positional transducer 20 monitors the position of the spindle 12 relative to the position of the force producing device 14. The positional transducer 20 supplies a position signal to the servo controller 16 that corresponds to a given position of the spindle 12 as measured through the force producing device 14.

Once a workpiece attached to a holding device, such as a semiconductor wafer carrier 30 (see FIG. 2), and mounted to the spindle 12 is moved to the processing surface, the spindle assembly switches from a position control mode to a force control mode. In the force control mode, the servo controller 16 responds to a force control feedback loop 22 that carries a load sense signal produced by a load cell 24 to the servo controller 16. The load sense signal corresponds to a pressure the load cell senses at the end of the spindle 12. The force control feedback loop 22 provides control of the force applied to the workpiece by the force producing device through the spindle. The pressure at the workpiece is equal to the force applied divided by the area of the workpiece.

Figure 2:
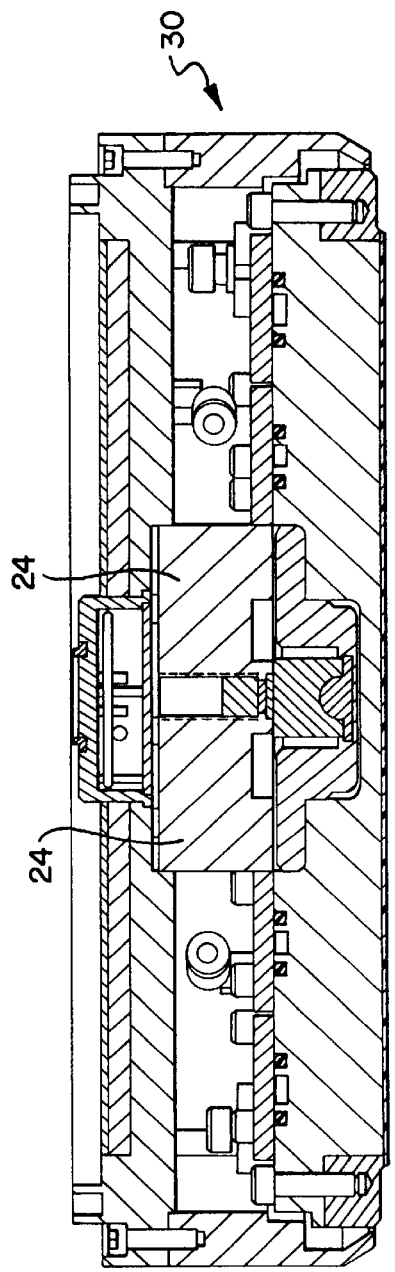
FIG. 2 is a cross-sectional view of a wafer holder suitable for use with the apparatus of FIG. 1.

As shown in FIG. 2, the load cell 24 is preferably positioned in the wafer carrier 30 attached the end of the spindle 12. A suitable wafer carrier is the single point gimbal wafer carrier available from Lam Research Corporation of Fremont, Calif. Any of a number of commercially available load cells may be used. In applications such as chemical mechanical planarization (CMP) and polishing of eight inch diameter semiconductor wafers, a push-pull type load cell having a range of 0–500 lbf may be used to obtain a sensitivity of approximately 0.10 pounds per square inch. One suitable load cell is the LPU-500-LRC-C available from Transducer Techniques of Temecula, Calif. Transducers having other ranges may also be used for other CMP or polishing applications.

An advantage of sampling the force applied at the end of the spindle 12 is that any losses due to friction in the force producing device 14 are accounted for. Also, in other embodiments of the spindle assembly where multiple actuators or mechanical linkages may be used, the potential losses due to friction generated by these components are taken into account by sampling the force at the workpiece.

Referring again to FIG. 1, the load sense signal sent from the load cell 24 along the force control feedback loop 22 is amplified by a load cell amplifier 26 such that an appropriate signal level is presented to the servo controller 16. The servo controller 16 sends a signal to the force producing device 14 based on signals received from either the position feedback loop 18 or force sensing feedback loop 22. The servo controller then adjusts the axial position of the spindle based on the force control feedback loop. In one embodiment, an ACR2000/PS/E4/D4/00/A8/0/0 motion controller from Acroloop in Chanhassen, Minn. may be used as the servo controller.

A processor 28, which may be a personal computer, controls the servo controller and continuously tracks any load sense signal sent on the force sensing feedback loop 22. The processor also provides start and stop commands to the servo controller 16 as well as the desired pressure setting. The servo controller is preferably programmed to automatically switch between the position feedback loop for coarse movement of the spindle and the force feedback loop for maintaining a precise pressure on the workpiece once certain criteria are met. The processor 28 communicates with the servo controller to set initial parameters for the feedback loops and to monitor the spindle assembly 10. These parameters are stored in memory 17 at the servo controller 16. The initial parameters include force and position loop gain values for the spindle drive assembly. The force feedback loop gain values are determined from integral, proportional and derivative gains that are empirically determined based on the total mass being moved and the known response of the force producing device. For example, if the force producing device is a linear motor, than the gain values are empirically derived using the standard linear motor self-tuning software provided by the manufacturer of the particular linear motor utilized.

The servo controller's decision to switch between force feedback and position feedback may be based on any one of a number of criteria. In one embodiment, the servo controller is programmed to switch from position feedback to force feedback when the workpiece contacts the work surface and the load cell provides a signal indicative of a pressure against the workpiece. In this embodiment, the servo controller is also programmed to automatically switch back from the force feedback loop to the position feedback loop when the workpiece has pulled back from the work surface and the load cell senses no pressure. In another embodiment, the servo controller may be programmed in a position mode that counts the number of steps that the spindle moves towards the work surface and simply switches from position feedback control to force feedback control at the end of a desired number of steps. In yet another embodiment, the servo controller may be programmed to have the force producing device move the spindle at a desired velocity and switch over from position to force feedback when an external device, such as an electric eye, is triggered.

According to one preferred embodiment, the force producing device 14 is an electromagnetic force producing device that is designed to produce a constant force output while resolving extremely small force increments and providing a high system frequency response. Suitable electromagnetic force producing devices are linear motors and voice coils. The spindle assembly 10 uses a servo controlled electromagnetic force producing device 14 in a non-traditional manner. With traditional linear motors and other servo motor mechanisms, a linear transducer is typically used to resolve positional feedback via a motion controller. The controller then provides an amplifier with the correct information to vary the electromagnetic field in the servo motor in order to achieve the desired position. When the system has reached the desired position, any change in force is offset by the servo motor so as to maintain a constant position.

As shown in FIG. 1, a preferred spindle assembly 10 uses a force producing device 14 for both gross motion of the spindle, which is controlled by a position feedback loop 18, and as a force control device, which is controlled by the force sensing feedback loop 22. By closing the loop on force instead of position, the position maybe varied while the system maintains a constant force output. As explained above, the servo controller may be programmed to automatically switch between the force and position feedback loops based on signals from the load cell indicating whether or not the workpiece is in contact with the worksurface. This approach may also be used to create constant torque devices for use in applications such as lens/mirror or computer hard drive substrate polishing.

Figure 3:
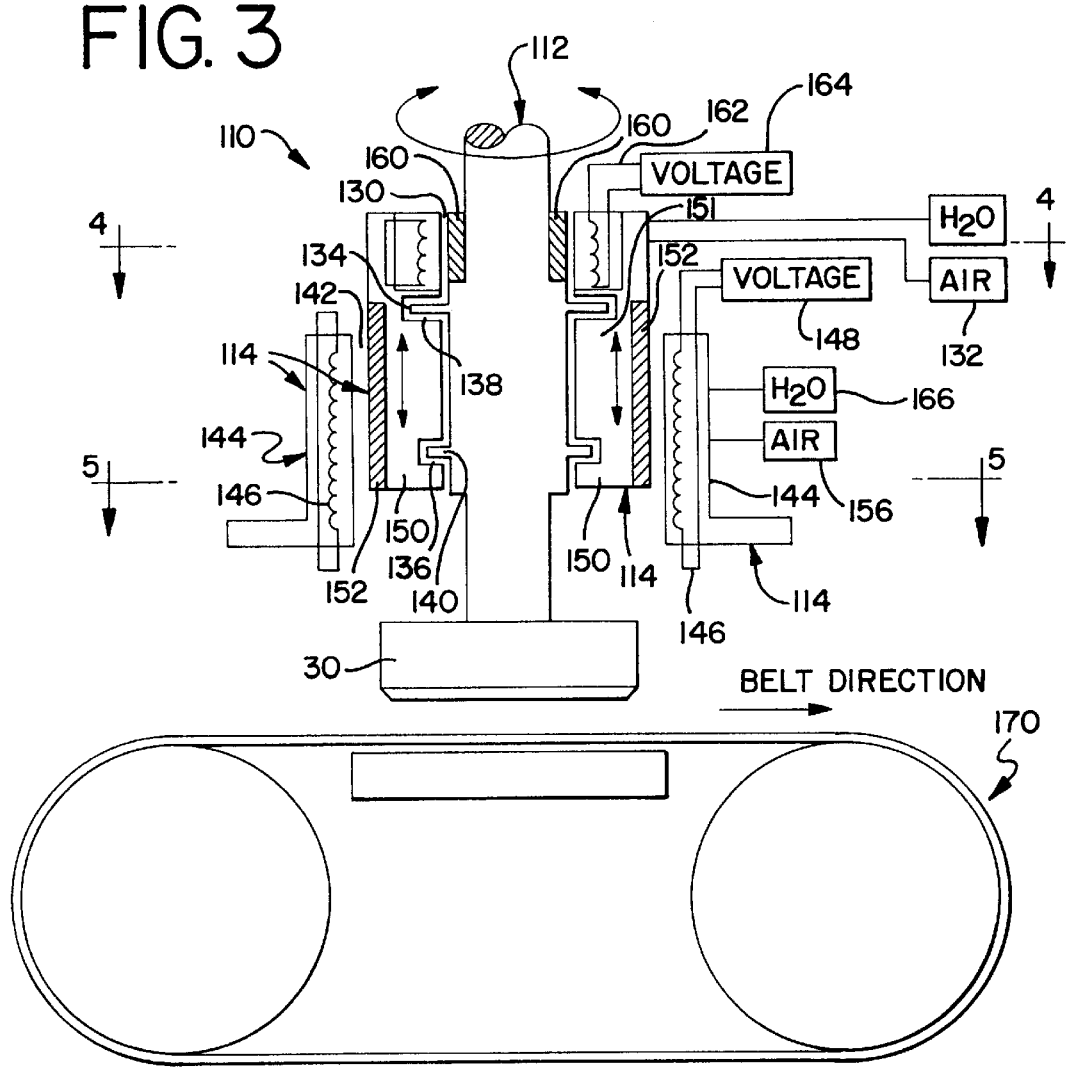
FIG. 3 is a cross-sectional view of a force producing device and linear belt polisher for use with the apparatus of FIG. 1.
Figure 4:
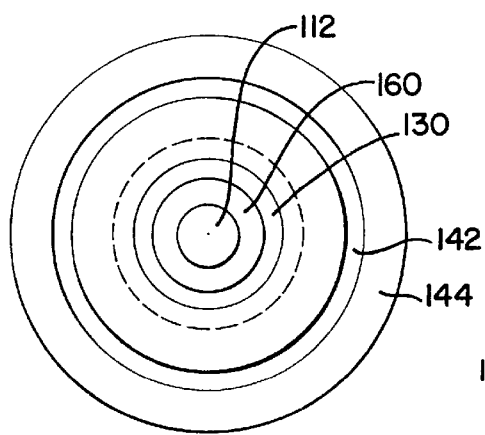
FIG. 4 is a cross-sectional view taken along line 4—4 of FIG. 3.
Figure 5:
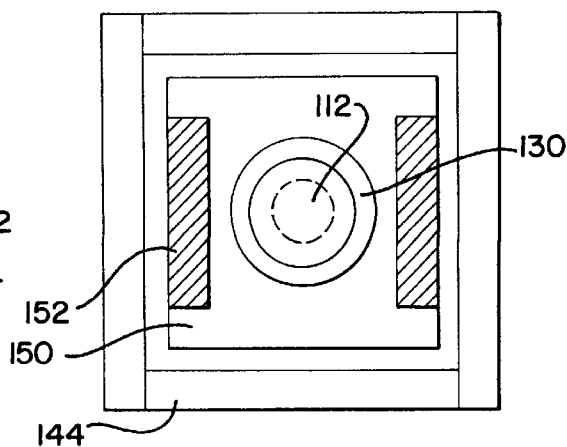
FIG. 5 is a cross-sectional view taken along line 5—5 of FIG. 3.

FIGS. 3–5 illustrate one preferred spindle assembly 110 positioned above a linear belt polisher 170 where the electromagnetic force producing device includes a pair of linear motors 114 positioned on opposite sides of the spindle 112. The linear motors 114 are coupled to the spindle 112 via a first aerostatic bearing 130. The aerostatic bearing 130 creates an air cushion around the spindle 112 using a forced air supply 132 provided to a spindle assembly 110. The aerostatic bearing 130 also includes aerostatic thrust bearings 134, 136 that use the air cushion in cooperation with flanges 138, 140 extending radially from the spindle 112, to prevent undesired axial movement of the spindle along the spindles longitudinal axis. The first aerostatic bearing 130 preferably completely surrounds the circumference of the spindle over a predetermined length of the spindle 112. The first aerostatic bearing provides for substantially frictionless rotational motion of the spindle 112 about the spindle's longitudinal axis. A suitable aerostatic bearing is available from Six Degrees Consultants of Redwood City, Calif. In another embodiment, only one thrust bearing and one flange are necessary to obtain an appropriate level of substantially frictionless rotation.

The linear motors 114 provide positional and force control along the longitudinal axis of the spindle 112. Each linear motor includes a stator 144 having multiple windings 146 that receive power from a voltage source 148. Each linear motor 114 also includes a rotor 150 mounted on a linear guide assembly 151 positioned coaxially around the spindle 112. The rotor magnet 152 on each rotor 150 is designed to cooperate with the coils 146 of the respective stator 144 mounted to a fixed frame (not shown). In operation, heat is generated by the linear motors 114. A water supply 166 may be used to pump water through cooling channels in each stator 144, adjacent to the coils 146, to remove excess heat.

A second aerostatic bearing 142 maintains an air gap between the rotors 144 and stators 150 and substantially eliminates friction in the linear motors. The second aerostatic bearing 142 receives a flow of pressurized air, from a second forced air supply 156. The second aerostatic bearing reduces friction and accompanying frictional hysteresis in the spindle assembly 112. Although conventional linear rail bearings maybe used, aerostatic bearings are preferred because they are well suited to handle the high attraction forces generated between the rotor and the stator of the linear motors. Typical linear rail bearings produce a frictional hysteresis in excess of the force output resolution capable with the linear motor. In addition to the lower friction obtainable with aerostatic bearings, the use of an aerostatic bearing 142, as compared to linear bearings, improves the radial runout characteristics of the spindle 112.

In one embodiment, the linear motors 114 may be any commercially available linear motor capable of producing pressure in a desired range at a workpiece. For example, a linear motor having a resolution of approximately 2 microns and a linear force producing capability of 1350 lbf, such as part no. IC33-200A2-640-640-AC-HDIC-100-P1-TR available from Kollmorgen Co. of Laguna Hills, Calif., may be used. The air supplies may be any of a number of commercially available air pumps capable of maintaining a desired air pressure. The air gap generated by each of the aerostatic bearings is preferably at least 0.001 inches. The water supply may be any standard water circulation system capable of maintaining the operating temperature of the linear motors within a desired range.

The spindle assembly 110 maybe used with a single linear motor mounted on one side of the spindle. A pair of linear motors 114 mounted on opposite sides of the spindle 112 (FIG. 3 and 4) is preferred because the opposing linear motors minimize the requirements for the second aerostatic bearing 142. Other groupings of linear motors mounted in a balanced fashion around the circumference of the spindle may also be used. Use of multiple linear motors would preferably include a separate servo controller for each linear motor where each servo controller maintains its own position and force feedback loops to account for the positional feedback and force control feedback necessary for each linear motor.

An advantage of the spindle assembly 110 illustrated in FIGS. 3–5 is that the servo controlled, electromagnetic force producing device, in this example a pair of linear motors 114, cooperates with the aerostatic bearings to present an essentially frictionless, highly controllable force/position system. The linear motors perform two functions. They apply a constant electromagnetic force directly to the spindle and they lower the spindle to a programmable height for polishing/buffing of a workpiece. They also allow for a force output resolution of at least $P/2^n$, where P is a maximum force produced by the electromagnetic force producing device and n is the output resolution of the servo controller 16 (FIG. 1) used to control the force producing device. In order to maximize the accuracy of the force control feedback loop, the load cell in the wafer carrier 30 may be calibrated using a multi-point calibration over the full scale of the load cell. Additionally, the servo controller may be programmed to use linear interpolation, curve interpolation, or non-linear functions of any desired order to more accurately translate the signal received from the load cell and compensate for non-linear response properties.

In another preferred embodiment, a single, cylindrical voice coil or cylindrical linear motor maybe used to provide additional balance of radial forces and simplify mounting issues. A cylindrical voice coil or cylindrical linear motor would also only require a single pair of feedback loops.

Referring again to FIG. 3, the spindle 112 maybe rotated using a DC servo motor 158. The DC servo motor 158 would include a permanent magnet 160 mounted on the spindle itself and a coil 162 mounted to the rotor 150 of the linear motor. A power source 164 feeds the coil 162 of the DC servo motor 158. The DC servo motor 158 takes advantage of the first aerostatic bearing 132 to provide substantially frictionless rotational energy to the spindle.

Figure 6:
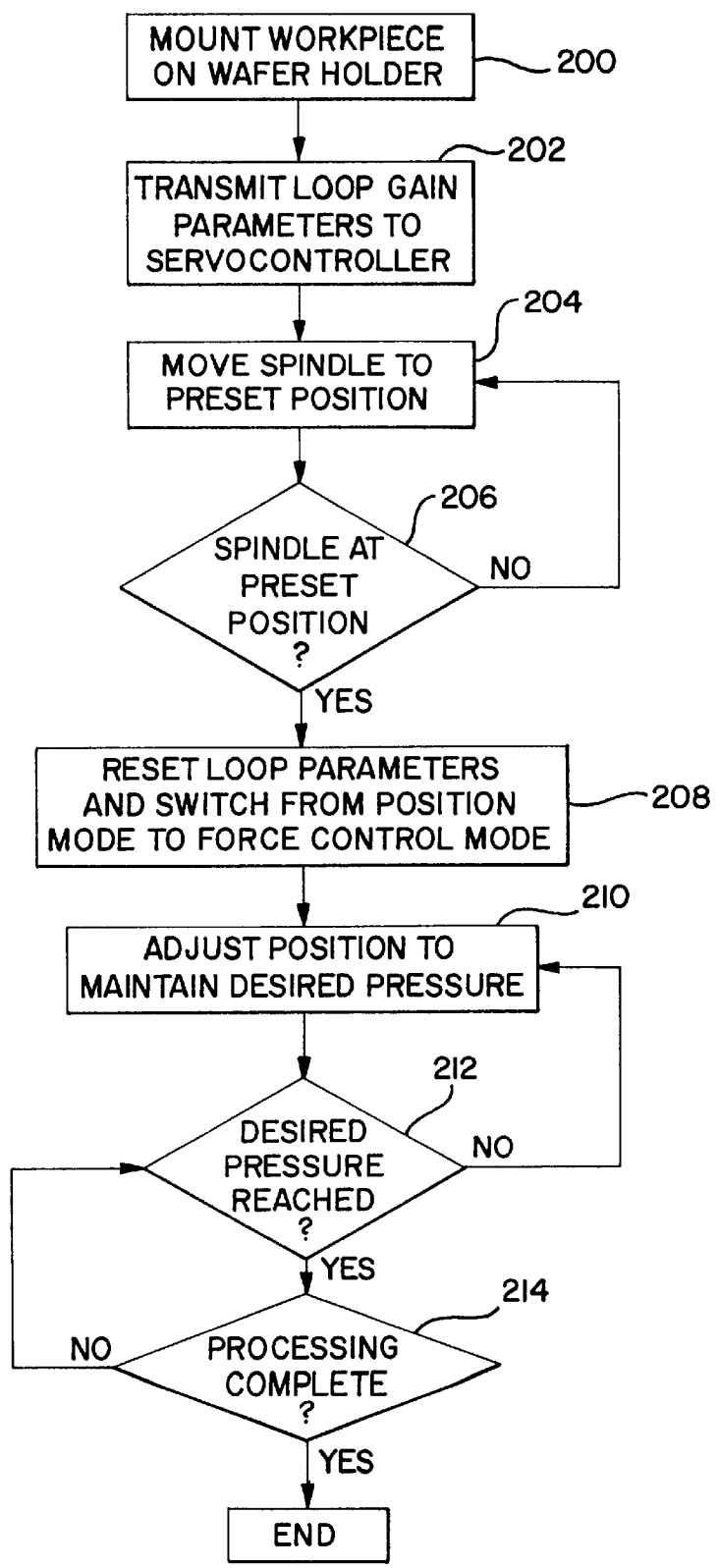
FIG. 6 is a flow chart illustrating a method of controlling the spindle assembly of FIG. 1 according to a preferred embodiment of the present invention.

Utilizing the spindle assembly of FIG. 1, the operation of the spindle assembly 10 is illustrated in FIG. 6. A workpiece, such as a semiconductor wafer, is mounted on a wafer holder removably attached to the spindle (at 200). The processor in the spindle assembly transmits operating parameters to the servo controller (at 202). The parameters include a set of position loop gain parameters and a set of force control gain parameters. For the initial gross motion increments required to bring the semiconductor wafer to the processing surface, the processor sets the force control gain parameters to zero and provides non-zero position loop gain parameters to the servo controller. The servo controller then moves the spindle linearly along the longitudinal axis of the spindle (at 204) until the spindle has traveled a predetermined distance that corresponds to the semiconductor wafer contacting the processing surface (at 206).

At this point, the processor resets the gain parameters for the position feedback loop and the force control feedback loop so that the servo controller responds to load sense signals produced by the load cell (at 208). The processor accomplishes this by setting the position feedback loop gains to zero and the force control feedback gains to non-zero values. Utilizing the force control feedback loop, the position of the spindle is now adjusted based on force measured at the load cell so that the spindle will move to compensate when the desired pressure is not sensed (at 210, 212). Once the planarization, polishing, or other processing is completed, the spindle assembly ceases the monitoring of applied force and backs the spindle away from the processing surface (at 214). Additionally, the semiconductor wafer or other workpiece may be rotated while being held against the processing surface by engaging the DC servo motor on the end of the spindle to rotate the spindle about the spindle's longitudinal axis.

One preferred environment in which the spindle assembly 10, 110 may be used is in a chemical mechanical planarization (CMP) system for planarizing or polishing semiconductor wafers. Available CMP systems, commonly called wafer polishers, often use a rotating wafer holder that brings the wafer into contact with a polishing pad moving in the plane of the wafer surface to be planarized. A polishing fluid, such as a chemical polishing agent or slurry containing microabrasives, is applied to the polishing pad to polish the wafer. The wafer holder then presses the wafer against the linearly moving or rotating polishing pad and is rotated to polish and planarize the wafer. One suitable linear wafer polisher with which the spindle assembly may be used is the TERES™ polisher available from Lam Research Corporation in Fremont, Calif.

From the foregoing, a method and apparatus for a force controlled spindle assembly has been described. One embodiment of the method includes the steps of moving the spindle towards a processing surface in gross movement increments with a force producing device by monitoring the spindle position with a position feedback loop. Once the workpiece attached to a holding device on the end of the spindle reaches the process surface, the gain parameters of the position feedback loop and a force control feedback loop are changed and the spindle assembly adjusts the position of the spindle based on force measurements.

A spindle assembly for force controlled polishing is also disclosed. In one embodiment, the spindle assembly includes a rotatable, axially movable spindle and a force producing device operatively coupled to the spindle. A servo controller is in communication with the force producing device and provides a control signal to the force producing device based on information from either a first feedback loop or a second feedback loop. The first feedback loop provides spindle position information and the second feedback loop provides information on pressure sensed at the workpiece mounted on the end of the spindle. The same force producing device is used to control spindle position in a first mode of operation and to maintain a constant force on the workpiece in a second mode of operation. The force producing device is preferably an electromagnetic force producing device such as one or more linear motors or voice coils. In order to maximize force resolution for the spindle assembly, at least one aerostatic bearing is preferably used to minimize friction generated by longitudinal or rotational movement of the spindle.

It is intended that the foregoing detailed description be regarded as illustrative rather than limiting, and that it be understood that the following claims, including all equivalents, are intended to define the scope of this invention.

I claim:

1. A spindle assembly for force controlled processing of a workpiece, the force controlled spindle assembly comprising:

a holding device for holding the workpiece;

an axially movable spindle, the holding device connected to one end of the axially movable spindle;

a load cell mounted on the holding device, the load cell positioned to sense a pressure applied to the workpiece and produce a load sense signal representative of the pressure applied;

a force producing device operatively coupled to the axially movable spindle, the force producing device configured to impart a force along a longitudinal axis of the spindle;

a positional transducer operatively connected to the spindle, the positional transducer positioned to sense an axial position of the spindle and produce a position signal representative of the axial position of the spindle; and a servo controller in communication with the positional transducer via a first feedback loop for receiving the position signal, in communication with the load cell via a second feedback loop for receiving the load sense signal, and in communication with the force producing device, wherein the servo controller controls the force producing device based on one of the position signal and the load sense signal.

2. The apparatus of claim 1, wherein the axially movable spindle configured for rotation about the longitudinal axis.

3. The apparatus of claim 1, wherein the workpiece comprises a semiconductor wafer.

4. The apparatus of claim 1, wherein the force producing device comprises an electromagnetic force producing device.

5. The apparatus of claim 4 wherein the electromagnetic force producing device comprises a linear motor.

6. The apparatus of claim 4 wherein the electromagnetic force producing device comprises a voice coil.

7. The apparatus of claim 4, wherein the electromagnetic force producing device comprises a first linear motor and a second linear motor, and wherein the first and second linear motors are positioned on radially opposite sides of the spindle and are configured to move the spindle along the longitudinal axis.

8. The apparatus of claim 1, further comprising at least one aerostatic bearing coaxially positioned around the spindle, the aerostatic bearing permitting axial movement of the spindle and rotation of the spindle relative to the longitudinal axis of the spindle.

9. The apparatus of claim 1, wherein the servo controller further comprises a memory, an output amplifier, and a processor connected to the memory and the output amplifier.

10. The apparatus of claim 9, wherein the memory stores a first gain parameter for the first feedback loop and a second gain parameter for the second feedback loop.

11. The apparatus of claim 1, further comprising a processor in communication with the second feedback loop and in communication with the servo controller.

12. A method for force controlled processing of a semiconductor wafer mounted on an end of an axially movable spindle operatively coupled to a force producing device, the force producing device controllable by a first feedback loop and a second feedback loop, the method comprising:

moving the spindle along a longitudinal axis;

monitoring a position of an axially movable spindle via the first feedback loop;

disengaging the first feedback loop when the spindle reaches a first position;

engaging the second feedback loop, the second feedback loop monitoring pressure applied at the semiconductor wafer; and maintaining a substantially constant force at the semiconductor wafer on the end of the spindle by adjusting the position of the spindle in accordance with the monitored pressure, wherein the position of the spindle and the pressure applied at the semiconductor wafer are controlled using the force producing device.

13. The method of claim 12, wherein the step of disengaging the first feedback loop further comprises the step of adjusting a first gain parameter for the first feedback loop.

14. The method of claim 13, wherein the step of engaging a second feedback loop further comprises adjusting a second gain parameter for the second feedback.

15. The method of claim 12, wherein the steps of disengaging the first feedback loop and engaging the second feedback loop further comprise setting the first gain parameter for the first feedback loop to zero and setting the second gain parameter for the second feedback loop to a predetermined value, wherein the second feedback loop controls the force applied to the semiconductor wafer.

16. A force controlled spindle assembly for applying a constant pressure to a workpiece, the force controlled spindle assembly comprising:

a rotatable, axially movable spindle, a holding device connected to one end of the rotatable, axially movable spindle;

an electromagnetic force producing device operatively coupled to the spindle, the electromagnetic force producing device configured to impart a force along a longitudinal axis of the spindle;

a servo controller in communication with the electromagnetic force producing device and providing a control signal to the electromagnetic device;

a first feedback loop for communicating a position signal representative of a position of the spindle to the servo controller from a position transducer; and a second feedback loop for communicating a load sense signal representative of a pressure applied to a workpiece by the spindle to the servo controller from a load sensor, the load sensor positioned adjacent the workpiece.

17. The apparatus of claim 16 wherein the electromagnetic device comprises a linear motor.

18. The apparatus of claim 16 wherein the electromagnetic device comprises a voice coil.

19. The apparatus of claim 16, wherein the electromagnetic force producing device comprises a first linear motor and a second linear motor, and wherein the first and second linear motors are positioned on radially opposite sides of the spindle and configured to move the spindle along the longitudinal axis of the spindle.

20. The apparatus of claim 16, further comprising at least one aerostatic bearing coaxially positioned around the spindle, the aerostatic bearing permitting axial movement of the spindle and rotation of the spindle relative to the longitudinal axis of the spindle.

21. The apparatus of claim 16, further comprising a first aerostatic bearing disposed between the spindle and a first portion of the electromagnetic force producing device, and a second aerostatic bearing disposed between the first portion of the electromagnetic force producing device and a second portion of the electromagnetic force producing device.

22. The apparatus of claim 21, further comprising a motor operatively coupled to the spindle, the motor configured to impart a rotational force to the spindle about the longitudinal axis of the spindle.

23. A spindle assembly for force controlled chemical mechanical planarization processing of a workpiece, the force controlled spindle assembly comprising:

a holding device for holding the workpiece;

an axially movable spindle, the holding device connected to one end of the axially movable spindle;

a load cell mounted on the holding device, the load cell positioned to sense a pressure applied to the workpiece and produce a load sense signal representative of the pressure applied;

a positional transducer operatively connected to the spindle, the positional transducer positioned to sense an axial position of the spindle and produce a position signal representative of the axial position of the spindle;

a force producing device operatively coupled to the axially movable spindle, the force producing device configured to impart a force along a longitudinal axis of the spindle; and a servo controller in communication with the force producing device, the load cell and the positional transducer, the servo controller having a first mode of operation wherein the servo controller controls a position of the spindle using the force producing device based on the position signal, and the servo controller having a second mode of operation wherein the servo controller controls a force applied by the force producing device to the workpiece based on the load sense signal.

* * * * *

UNITED STATES PATENT AND TRADEMARK OFFICE
CERTIFICATE OF CORRECTION

PATENT NO. : 6,083,082
DATED : July 4, 2000
INVENTOR(S) : Miguel A. Saldana

It is certified that error appears in the above-identified patent and that said Letters Patent is hereby corrected as shown below:

In claim 2, line 2, after "spindle" insert --is--.

Signed and Sealed this

Eighth Day of May, 2001

Attest:

NICHOLAS P. GODICI

Attesting Officer     Acting Director of the United States Patent and Trademark Office